United States Patent [19]

Rusch et al.

[11] 4,277,308
[45] Jul. 7, 1981

[54] COUNT-DOUBLING TIME SAFETY CIRCUIT

[75] Inventors: Gordon K. Rusch, Downers Grove; Donald J. Keefe, Lemont; William P. McDowell, Downers Grove, all of Ill.

[73] Assignee: The United States of America as represented by the United States Department of Energy, Washington, D.C.

[21] Appl. No.: 918,259

[22] Filed: Jun. 23, 1978

[51] Int. Cl.³ .......................... G21C 17/00; G01T 3/00
[52] U.S. Cl. ............................................... 176/19 EC
[58] Field of Search ............... 176/19 R, 19 J, 19 EC; 250/390, 392

[56] References Cited

U.S. PATENT DOCUMENTS

| | | | |
|---|---|---|---|
| 3,069,545 | 12/1962 | Lide et al. | 176/19 J |
| 3,366,544 | 1/1968 | Bunch | 176/19 EC |
| 3,894,912 | 7/1975 | Cohn | 176/19 EC |
| 3,931,522 | 1/1976 | Rusch | 176/19 J |
| 3,942,014 | 3/1976 | McDowell et al. | 176/19 EC |

OTHER PUBLICATIONS

J. Nuc. Sci. & Tech., vol. 8 [10], pp. 558-562 (10/71), Iwokuchi et al., Digital Period Meter.
AIEE Trans., Pt. 1, vol. 79 (9/60), pp. 360-375, Lehr et al.
Power Reactor Tech., vol. 5, No. 2 (3/62), pp. 61-73.

*Primary Examiner*—S. A. Cangialosi
*Attorney, Agent, or Firm*—Paul A. Gottlieb; Frank H. Jackson; James E. Denny

[57] ABSTRACT

There is provided a nuclear reactor count-factor-increase time monitoring circuit which includes a pulse-type neutron detector, and means for counting the number of detected pulses during specific time periods. Counts are compared and the comparison is utilized to develop a reactor scram signal, if necessary.

5 Claims, 1 Drawing Figure

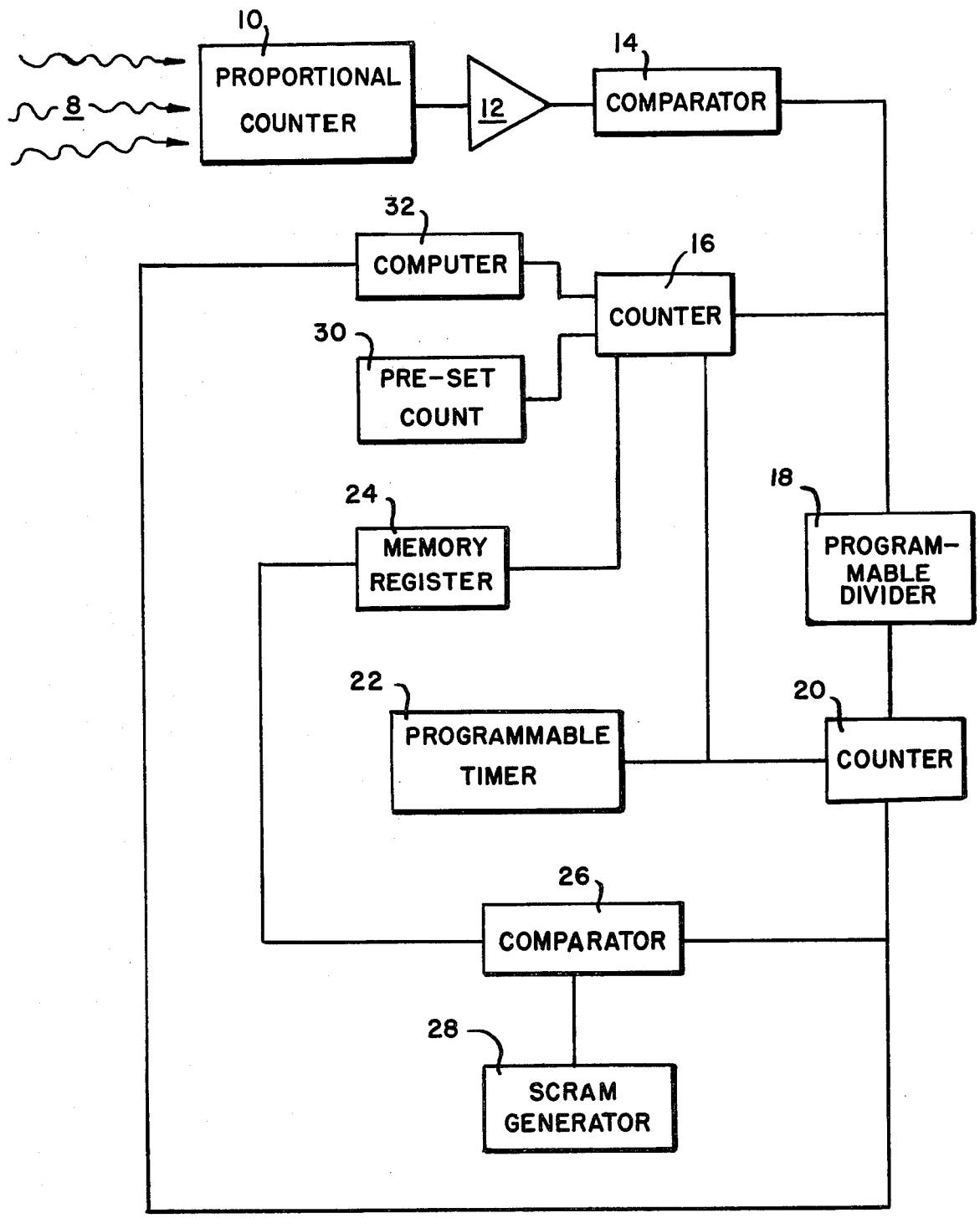

COUNT-DOUBLING TIME SAFETY CIRCUIT

CONTRACTUAL ORIGIN OF THE INVENTION

The invention described herein was made in the course of, or under, a contract with the UNITED STATES DEPARTMENT OF ENERGY.

BACKGROUND OF THE INVENTION

The reactor period, T, is the time required for the power level of a nuclear reactor to increase by a factor e (the base of natural logarithms). When the reactor period becomes too short, i.e., the power level is increasing too rapidly, a reactor scram should be initiated. Existing rate of change of power level monitoring circuits measure the reactor period by using an appropriate circuit to obtain the logarithm of the counting rate and subsequently differentiating this signal with respect to time. If the reactor is on an asymptotic period, the resulting signal is a measure of the reactor period. At low counting rates, the statistical fluctuations associated with the conventional log count rate and differentiating circuits are large. Either excessively long time constants must be incorporated in the log count rate and differentiating circuits or relatively frequent spurious scram signals must be accepted. Further, conventional circuits have been required to utilize primarily analog rather than digital circuit elements.

At low and medium reactor power levels, it is acceptable to allow modest increases in power level before initiating protective action even though the reactor power level may be increasing too rapidly, provided the protective action is very fast after the acceptable power level increase has been reached.

It is, therefore, an object of this invention to provide a rate of change of reactor power level monitoring circuit by means of a count-factor-increase time monitoring circuit. The rate of change of reactor power level as measured by this circuit can be related to an asymptotic reactor period.

Another object of this invention is to provide a digital rate of change of reactor power level monitoring circuit operable at low power levels with reduced numbers of spurious reactor scram signals.

A method and means is described for monitoring the rate of change of reactor power level. The output of a pulse-type neutron detector is utilized by comparing the number of neutron-induced events which occur within any preselected, fixed time interval to the number of neutron-induced events which occurred during the immediately-preceding equal length time interval. If the second count is larger than the preceding count by any preselected factor greater than unity, then the reactor power level is deemed to be increasing at an unacceptable rate and a reactor scram is to be induced.

SUMMARY OF THE INVENTION

A method and means is described for monitoring reactor period. The output of a pulse-type neutron detector is utilized by comparing the amount of time it takes for the number of neutron-induced events to occur with the amount of time it takes for a multiple of that number of neutron-induced events to occur during the next succeeding time period. If the amount of time for doubling or some other integer multiple of the count rate exceeds a predetermined value, then the reactor period is deemed at an unacceptable level and a reactor scram is to be induced.

This is accomplished in one embodiment by monitoring doubling time of the reactor-induced neutron count rate. A first count is obtained during a time period $\Delta t$ and a second count is obtained during the next time period which may persist for a duration up to $\Delta t$. The number of neutron-induced events from each count is compared and if the second count equals or exceeds twice the first number before the second $\Delta t$ time interval elapses, then a scram signal is generated when this occurs.

BRIEF DESCRIPTION OF THE DRAWING

The drawing is a block diagram of a digital rate of change of reactor power level count-factor-increase time monitoring circuit.

DETAILED DESCRIPTION

According to the drawing, there is shown a reactor flux level 8 which is increasing monitonically with time and which is monitored by a monitoring circuit. The monitoring circuit includes a proportional counter 10 which is a device which develops an output pulse in response to a neutron being incident thereon, i.e., it is a pulse-type neutron detector. The proportional counter 10 is positioned in the nuclear reactor environment and the output pulses therefrom are applied to a pulse amplifier system 12 and then to a comparator 14. Comparator 14 separates neutron-induced pulses for unwanted pulses on the basis of pulse amplitude. Thus, comparator 14 will output neutron-induced pulses which are applied to counter 16. Counter 16 counts the pulses it receives.

The pulses from comparator 14 are also applied to a programmable divider 18 which generates one output pulse after each n pulses from the comparator 14, thus, in effect dividing by n the output of comparator 14. Programmable divider 18 could be set to any integer value as will be described. The output of divider 18 is applied to counter 20 which counts the number of pulses from divider 18.

Programmable timer 22 is coupled to counter 16 and counter 20 and develops a command signal every $\Delta t$ time period with $\Delta t$ being determined as will be described. In response to a command signal from timer 22, counter 16 updates the value contained in memory register 24. Also in response to the command signal from timer 22, i.e., after each time period $\Delta t$, each counter 16 and 20 is reset to zero so that they begin a new counting cycle.

Comparator 26 compares the value of the output of counter 20 with value stored in register 24. If the value of counter 20 is greater than or equal to the value stored in register 24, comparator 26 generates a trip signal. Scram generator 28 is responsive to a trip signal from comparator 26 to generate a reactor scram signal, indicating that the reactor power level is increasing at an unacceptable rate.

The count-factor-increase time monitor operates as follows: beginning at zero counts, counter 16 counts the number of neutron-induced pulses from detector 10 for the first $\Delta t$ time period. At the end of the first $\Delta t$ time period, the count achieved is stored in register 24. During the next or second $\Delta t$ time period, counter 16 again starts at zero and counts the number of neutron-induced pulses from detector 10. Also during the second $\Delta t$ time period, counter 20 is counting the number of neutron-induced pulses from detector 10 divided by n. During the second Δt time period, comparator 16 is constantly comparing the count of counter 20 with the value stored in register 24, which will be the value counted by counter 16 during the first Δt time period, and if the count of counter 20 is at any time equal to or greater than the value stored in memory register 24, a trip signal is generated at that time by comparator 26. This indicates that the rate of change of the reactor power level has exceeded the allowed value and the reactor should be scrammed. At the end of each Δt time period, the value stored in register 24 is updated to the value counted by counter 16, and the counters 16 and 20 are zeroed. A new monitoring cycle is begun.

It is apparent that during the first cycle of operation, register 24 will have no value stored therein. To start monitoring, one can use a preset input count 30 to preset register 24, so that this preset value is initially set in register 24. The comparators can be inhibited during this preset operation.

The theory underlying the operation of the monitor is that the reactor period and the count-factor-increase have been determined to obey the following relation, providing one assumes that reactor period is constant for a given time span equal to twice Δt or longer:

$$T_{j-(j+1)} = \frac{\Delta t_{j-(j+1)}}{\ln[N_{(j+1)}/N_j]}$$

where
  $T_{j-(j+1)}$ is an asymptotic period measured between time intervals $t_{(j-1)}$ and $t_{(j+1)}$,
  $N_{(j+1)}$ is the number of counts occurring between $t_j$ and $t_{(j+1)}$,
  $N_j$ is the number of counts occurring between $t_{(j-1)}$ and $t_j$, and
  $\Delta t_{j-(j+1)}$ is the time duration between time $t_j$ and time $t_{(j+1)}$. It is assumed that $\Delta t_{(j-1)-j} = \Delta t_{j-(j+1)} = \Delta t_{(j+1)-(j+2)}$, etc. Consider the case where $N_{(j+1)}/N_j = 2$. Programmable divider 18 will then have n=2 and the monitor will observe count-doubling time. Fundamentally, the count-doubling time measuring circuit measures the time necessary for the number of counts in the interval from $t_j$ to $t_{(j+1)}$ to equal twice the number of counts in the interval from $t_{(j-1)}$ to $t_j$. Thus it is generally more meaningful to think of this circuit in terms of count-doubling time rather than period. If this time is less than a prescribed value a scram is initiated as soon as $N_{(j+1)}/N_j$ is equal to 2. The scram will occur on the basis of the time required for $N_{(j+1)}/N_j$ to equal 2 regardless of whether the reactor is on an asymptotic or transient period. In practice, if the times required for $N_{(j+1)}$ to be twice $N_j$ are greater than the prescribed value, the circuits are reset at definite Δt intervals and $N_{(j+1)}$ replaces $N_j$ as the reference count; no scram is initiated.

The ratio $N_{(j+1)}/N_j$ may, of course, be any appropriate constant. However, the factor 2 is certainly acceptable from safety considerations for low and medium power level reactor operation and is convenient from circuit considerations. The statistics associated with $N_{(j+1)}/N_j = 2$ are also acceptable. If, for example, a scram is desired when $N_{(j+1)}/N_j = 2$ occurs in less than 4 seconds, a counting rate of 100 counts per second would result in the order of 400 counts during this interval. The standard deviation would be about 20 and a 10σ deviation would be only about 50% of the total count required to effect a scram. This fluctuation, although very large and very improbable, will not result in a scram if superimposed upon any reasonable operating period. With n=2 and Δt selected at 5 seconds, i.e. timer 22 set at 5 seconds, a reactor scram will be developed with T ≈ 7.2 seconds.

Generally one selects T in the range of 5–10 seconds. The minimum Δt that can be used is a statistical limitation in that there must be a sufficient Δt to allow for meaningful counts.

The count-factor-increase time monitoring circuit described is not by itself a good source of information for display or recording purposes. One way to obtain visual display information is to use separate comparator circuitry to determine the length of time for $N_{(j+1)}/N_j$ to reach some value such as 1.10. This time is a measure of the rate of the increase of the reactor power level. The time can be recorded by a scaler and transmitted to the display devices. Another method simply uses a microcomputer or programmable calculator 32 to interrogate counter 16 and counter 20 for information at appropriate time intervals, and then calculate the period or count-doubling times.

This new circuit is simple, fast and is capable of assuring that the reactor power level cannot rise too rapidly. By selecting a suitable $N_2/N_1$ ratio, the probability for spurious scrams can be negligible without compromising reactor safety. An inexpensive microcomputer or programmable calculator can be operated in parallel with the safety circuit to provide frequent updating of period or rate of change information for display and recording purposes.

We claim:
1. A rate of change of reactor power level count-factor-increase time monitor for developing a scram signal with the count-factor-increase time less than or equal to a particular value corresponding to an asymptotic period T, comprising a pulse-type neutron detector having a pulsed output developing pulses corresponding to the incidence of a neutron thereon, means coupled to said detector for counting the number of pulses $N_1$ therefrom during a first time period Δt, means coupled to said detector for counting the number of pulses $N_2$ therefrom during a next time period Δt divided by n, said next time period Δt beginning at the end of said first time period Δt, where n is greater than 1 and Δt=T(ln n), and comparator means coupled to both said means for counting and being responsive to the values counted thereof to develop a scram signal with $N_2 \geq 1.1 N_1$ during said next time period.

2. The monitor of claim 1 wherein said means for counting the number of pulses $N_2$ includes a programmable divider coupled to said detector and being responsive to the pulsed output thereof to develop a divider output, said divider output being pulsed with the number of pulses therefrom equal to the pulsed output of said detector divided by n, and a counter coupled to said divider and being responsive to said divider output to develop an $N_2$ output corresponding to the count of the number of pulses of said divider output.

3. The monitor of claim 2 wherein said means for counting the number of pulses $N_1$ includes a register coupled to said comparator means and which develops an output equal to the value of $N_1$ at the end of said first time period Δt, said comparator means comparing said output of said register $N_1$ with the output of said counter $N_2$ during said next $\Delta t$.

4. The monitor of claim 3 further including a programmable timer coupled to said counter and said means for counting the number of pulses $N_1$ and developing a command signal every $\Delta t$, said counter and said means for counting the number of pulses $N_1$ being responsive to said command signal to begin counting from zero again, said register being responsive to said command signal to update the value of said register's output so that said comparator means compares the count of said counter during a $\Delta t$ time period with $N_1$ from the previous $\Delta t$ time period.

5. The monitor of claim 4 further including a preset count coupled to said register for presetting said register's output during the first $\Delta t$ time period.

* * * * *